(12) United States Patent
Doehring et al.

(10) Patent No.: US 7,216,510 B2
(45) Date of Patent: May 15, 2007

(54) METHOD FOR THE FORMING OF GLASS OR GLASS CERAMICS

(75) Inventors: Thorsten Doehring, Mainz (DE); Ralf Jedamzik, Griesheim (DE); Hauke Esemann, Woerrstadt (DE); Eva Hoelzel, Ober-Olm (DE)

(73) Assignee: Schott AG, Mainz (DE)

( * ) Notice: Subject to any disclaimer, the term of this patent is extended or adjusted under 35 U.S.C. 154(b) by 587 days.

(21) Appl. No.: 10/636,717

(22) Filed: Aug. 7, 2003

(65) Prior Publication Data

US 2004/0107731 A1   Jun. 10, 2004

(30) Foreign Application Priority Data

Aug. 16, 2002 (DE) ................ 102 38 607

(51) Int. Cl.
*C03B 23/025* (2006.01)

(52) U.S. Cl. .............. 65/107; 65/106; 65/273

(58) Field of Classification Search ........... 65/107
See application file for complete search history.

(56) References Cited

U.S. PATENT DOCUMENTS

| | | | |
|---|---|---|---|
| 3,582,371 A | | 6/1971 | Bruno et al. |
| 3,600,204 A | * | 8/1971 | Beall et al. ............ 501/7 |
| 3,661,546 A | * | 5/1972 | Busdiecker et al. ....... 65/33.5 |
| 3,891,421 A | * | 6/1975 | Levin .............. 65/107 |
| 4,011,091 A | * | 3/1977 | McCollister ............. 501/4 |
| 4,043,784 A | * | 8/1977 | Reese et al. ........... 65/107 |
| 4,059,428 A | | 11/1977 | Andrews |
| 4,246,207 A | | 1/1981 | Spycher |
| 4,883,525 A | * | 11/1989 | Buckley et al. ........... 65/37 |
| 5,064,461 A | * | 11/1991 | Morena et al. ........... 65/33.3 |
| 5,147,437 A | * | 9/1992 | Bristol ............... 65/102 |
| 6,331,266 B1 | * | 12/2001 | Powell et al. ........... 264/313 |
| 6,360,653 B1 | * | 3/2002 | Rodek et al. ........... 99/339 |

FOREIGN PATENT DOCUMENTS

| | | |
|---|---|---|
| DE | 199 38 811 A1 | 9/2000 |
| EP | 0 060 460 | 9/1982 |
| EP | 1 170 264 A1 | 1/2002 |

OTHER PUBLICATIONS

Pfaender, Heinz G., Schott-Glaslexikon, 1997, pp. 26 and 27.
Author Unknown; "Development of Segmented X-ray Mirrors for the XEUS Mission"; 2001.
American Ceramic Society Bulletin; "Li2O-Al2O3-SiO2 Glass-Ceramics"; pp. 1926-1930; 1989.
M.H. Lewis, J. Metcalf-Johansen, P.S. Bell; "Crystallization Mechanisms in Glass-Ceramics"; 1977; pp. 278-288.

* cited by examiner

*Primary Examiner*—Eric Hug
*Assistant Examiner*—Queenie Dehghan
(74) *Attorney, Agent, or Firm*—Harness, Dickey & Pierce, P.L.C.

(57) ABSTRACT

A process for forming glass or glass ceramics is disclosed, wherein a glass ceramics form (12) is made from a starting glass by molding, which is transformed by a heat treatment into a keatite glass ceramic comprising predominantly keatite mixed crystals. With such a keatite glass ceramics form (12) formed bodies can be prepared from blank parts by sagging under gravity force at a temperature above the glass transition temperature of the blank part (14) (FIG. 1).

10 Claims, 1 Drawing Sheet

METHOD FOR THE FORMING OF GLASS OR GLASS CERAMICS

BACKGROUND OF THE INVENTION

The invention relates to a method for the forming of glass or glass ceramics, in particular for the preparation of mirror substrates, wherein a formed body is prepared from a blank by sagging under gravity force onto a mold.

The invention further relates to a method for preparing a mold suitable therefore.

From DE 199 38 811 A1 a method for the forming of glass ceramic parts is known according to which a blank is sagged under the influence of infrared irradiation, while possibly applying a vacuum or an excess pressure.

Such a forming method is suitable for forming a large number of blanks in three dimensions. Thus, e.g. trough-like or chamfer-like parts having a cross-section in circle segment form, rectangular, trapezoid or other form can be prepared.

The precision of the parts manufactured thereby naturally depends on the precision of the mold that is utilized. Up to now according to this method only mass-produced parts have been manufactured, while utilizing mostly metallic molds.

For the production of telescopes for scientific X-ray satellites up to now polished solid cylindric mirror shell substrates made of the glass ceramic ZERODUR® (glass ceramic, Schott Glas) have been utilized as projection optics. Due to the low reflectivity of all known materials for high-frequency X-rays at normal angle of incidence X-ray mirrors and X-ray telescopes are, preferably, operated at grazing incidence while taking advantage of the physical effect of total reflection. To this end two-piece telescopes for two reflexions are utilized, wherein the cylindric mirror shells have the specific forms of a parabola and a hyperbola which, according to Wolters, are particularly suited for such applications. For the telescopes of the scientific satellites ROSAT and CHANDRA polished solid cylindric mirror shell substrates of ZERODUR® (glass ceramic) were utilized as imaging optics. By contrast, for the X-ray satellite XMM-NEWTON galvanically produced nickel shells having a similar Wolters profile were utilized as mirror substrates. Up to now all X-ray satellites have applied conical solid cylindrical mirror substrates.

For the next generation of planned X-ray satellites (XEUS, CONSTELLATION-X) considerably larger telescopes are intended. Due to cost considerations such telescopes cannot be manufactured anymore as solid cylinders, but shall be composed of segmented mirror segments. Two different replicating methods for the mirror shells of these novel X-ray telescopes are currently intended to proceed from the single production of current X-ray mirrors to a line production and mass manufacturing for the planned satellites. Both methods utilize precision formed bodies of the glass ceramic ZERODUR® (glass ceramic), known as mandrels. The precision of the mandrel is transferred to the mirror shell segments by means of a nickel galvanic method (XEUS) or by means of duplicating utilizing an epoxy synthetic as an intermediate layer (CONSTELLATION-X). Both processes are performed at low temperatures below 100° C.

For the mentioned novel replicating processes for the manufacture of segmentized X-ray mirrors preformed glass substrates are necessary. This holds true for the planned project of NASA CONSTELLATION-X, as well as for the planned satellite of ESA XEUS, however, with respect to the latter only as an alternative technology for the favored galvanic method.

The mentioned mandrels of ZERODUR® (glass ceramic), are not suitable as molds for the manufacture of preformed glass substrates, since the operating range of ZERODUR® (glass ceramic), is 600° C. at the most, while already starting from 130° C. particular restrictions are present.

However, for a cost-effective molding of mirror substrates temperatures are necessary which, in part, are considerably above 600° C.

On the other hand, sintered ceramic molds cannot be manufactured in particular at large dimensions with the necessary form precision and precision (e.g. freeness from pores).

However, the manufacture of quartz molds is very expensive and restricted to smaller dimensions.

From EP 1,170,264 A1 it is basically known that glasses of the system $Li_2O$—$Al_2O_3$—$SiO_2$ can be transformed into glass ceramics (LAS glass ceramics) with high quartz mixed crystals and/or keatite mixed crystals as predominant crystal phases. These glass ceramics are prepared in various steps. After melting and hot forming usually the material is cooled below the glass transition temperature. Thereafter the base glass is transformed into a glass ceramic article by controlled crystallization. This ceramization is performed by an annealing process having several steps in which in the beginning nuclei are formed by nucleation at a temperature between 600 and 800° C., usually from $TiO_2$ or $ZrO_2/TiO_2$ mixed crystals. Also $SnO_2$ may take part in the nucleation. During a subsequent raise of temperature high quartz mixed crystals grow on these nuclei at a crystallization temperature of about 750 to 900° C. Herein the volume fraction between the crystalline high quartz mixed crystal phase and the glassy phase can be controlled in such a way that a coefficient of expansion of about 0 is reached. To this end normally a fraction of about 80% high quartz mixed crystals to about 20% residual glass is desired.

According to EP 1,170,264 A1 a short-time temperature increase up to 1100° C. or more is performed, whereby the glass ceramic is transformed into a ceramic having predominantly a keatite mixed crystal phase in the core and having a high quartz mixed crystal phase close to the surface.

However, the application of this glass ceramic disclosed herein is limited to cooking surfaces, cooking utensils, fire-proof glass etc.

SUMMARY OF THE INVENTION

It is a first object of the invention to disclose a method for the forming of glass or glass ceramics that is particularly suited for the manufacture of a mirror substrate, in particular for an X-ray mirror.

It is a second object of the invention to disclose a method for the forming of glass or glass ceramics, that allows the production of formed bodies in a cost-effective and efficient way.

It is a third object of the invention to disclose a method for the forming of glass or glass ceramics, that allows the production of formed bodies at a high precision which may be in the order of a surface form tolerance of 30 μm or even lower.

It is a forth object of the invention to disclose a mold and a process for making such a mold that can be utilized in the forming of glass or glass ceramics.

It is a fifth object of the invention to disclose a mold suitable for a sagging process of glass or glass ceramics at temperatures in excess of 600° C.

These and other objects of the invention are reached with respect to the mold for hot forming of glass or glass ceramics by preparing the mold as a glass ceramic mold from a base glass by casting, the base glass being heat-treated for transforming into a keatite glass ceramic comprising predominantly a keatite mixed crystal phase.

With respect to the method for the forming of glass or glass ceramics this object of the invention is solved by manufacturing a formed body by sagging, under the action of gravity force, at a temperature above the transition temperature of the blank, onto a keatite glass ceramic form consisting of a lithium-aluminosilicate glass ceramics comprising predominantly keatite mixed crystals.

The object of the invention is solved completely in this way.

The glass ceramic form of predominantly keatite phase manufactured according to the invention exhibits a high temperature resistance reaching up to approximately 1000° C., wherein even higher temperatures are possible for a short time. Thereby the mold according to the invention can be utilized for the molding of, e.g., a borosilicate glass in the sagging process at a temperature that is considerably higher than the transition temperature. In this way a high precision replicating of the mold consisting of keatite glass ceramic can be reached. This is not possible with prior art molds of the glass ceramic ZERODUR® (glass ceramic) which comprises as its predominant crystal phase the high quartz mixed crystal. By contrast to the common sintered ceramics, the keatite glass ceramic is almost pore free and can thus be easily polished. Pores at the mold surface would possibly produce detrimental defects on the glass substrate while sagging. This is avoided by the method according to the invention.

The coefficient of thermal expansion of keatite glass ceramic which between 20° C. and 700° C. is in the range of about 1 to $3 \times 10^{-6}$/K which is particularly suitable for the forming of borosilicate glasses, since their coefficient of thermal expansion is in the range of 3 to $4 \times 10^{-6}$/K. By contrast, the lower coefficient of thermal expansion of the glass ceramic ZERODUR® (glass ceramic) which is about $0.2 \times 10^{-6}$/K between 20° C. and 700° C., is much more unfavorable due to the bad matching with the coefficient of thermal expansion of borosilicate glasses.

The novel manufacturing process for the hot forming of glass or glass ceramics by utilizing a keatite glass ceramic mold leads to a considerably improved precision during the manufacture of the formed bodies, while the manufacturing process is simplified and at the same time a molding by means of a complicated nickel galvanic process is avoided.

It is even possible to cool the formed body in its transparent state to room temperature in the beginning to allow an inspection of the formed body with respect to its quality (freeness of pores, inclusions, inhomogenities, striae etc.). At the request of a particularly good homogeneity even an inspection with an interferometer is possible.

The transformation into a keatite glass ceramic can be reached in a subsequent heat treating step.

Since the keatite glass ceramic form is prepared from casted blank glass blocks, also large and thick molds can be prepared. Thereby the thickness of the mold also enhances the stiffness thereof and guarantees a better form precision. The potential alternative material quartz does not offer this possibility or only at considerably higher cost of manufacture.

Highly stable keatite glass ceramic molds can be reached even at large dimensions. Thus for instance diameters of 8 meters at a thickness of 20 centimeters or more can be reached.

The keatite glass ceramic offers a good long time stability and a high resistance against chemical environmental influences. A hysteresis effect known in the glass ceramic ZERODUR® (glass ceramic) does not occur in the keatite glass ceramic.

A glass ceramic mold according to the invention can be prepared with the following steps:

casting a lithium-aluminosilicate base glass into a mold;

annealing for nucleation at a nucleation temperature of about 600 to 900° C.;

annealing for the formation of a keatite glass ceramic at a keatite formation temperature of about 800 to 1300° C., until the crystalline phase is transformed predominantly into keatite mixed crystals;

cooling the glass ceramic mold thus formed to room temperature.

Herein basically it is possible, after annealing at nucleation temperature, initially to anneal at a higher crystallization temperature and to subsequently further increase the temperature, to transform the initially formed high quartz mixed crystals almost completely into keatite mixed crystals.

After casting of the base glass or after annealing for nucleation or crystallization the body thus formed can be inspected in its transparent state initially for its inner quality (bubbles, inclusions, inhomogenities, striae etc.), before the transition into an opaque body is performed by subsequent annealing.

Initially, by annealing at nucleation temperature and a subsequent annealing at crystallization temperature a glass ceramic may be prepared which contains predominantly high quartz as crystal phase. Thus e.g. from the base glass for the preparation of a ZERODUR® (glass ceramic) glass ceramic initially the ZERODUR® (glass ceramic) glass ceramic with predominant high quartz mixed crystal phase can be prepared, having a coefficient of expansion of $0 \pm 0.15 \times 10^{-6}$/K. By a subsequent heating and annealing to the higher keatite formation temperature the high quartz mixed crystals initially formed can be transformed almost completely into keatite mixed crystals.

Alternatively, also it may be operated without an intermediate cooling step, or after annealing for nucleation at a lower temperature in the region of about 650 to 850° C. immediately it can be heated to the higher temperature necessary for a keatite formation (in the region of about 800 to 1300° C.).

Also a three-step process cycle is possible by annealing initially at nucleation temperature in the region of about 650 to 850° C., with a subsequent annealing at crystallization temperature in the region of about 750 to 900° C. (for forming high quartz crystal phase), followed by an annealing at keatite formation temperature in the region between about 850 and 1300° C. for effecting transformation of the high quartz mixed crystals into keatite mixed crystals.

Annealing for keatite formation is preferably performed at a least 900° C., preferably at at least 1000° C. for at least one hour, in particular for at least two hours, particularly preferred for a time span of roughly four hours.

At even higher temperature the holding time may be shortened correspondingly.

According to the method according to the invention annealing for keatite formation is preferably performed at such a temperature and for such a time that the crystalline fraction is largely transformed into keatite. Preferably, herein at least 80 vol.-%, in particular about 85 vol.-%, and particularly preferred at least about 90 vol.-% of the crystalline fraction of the material is transformed into keatite mixed crystals.

At the most then a glassy residual phase may exist which may be enriched with high quartz mixed crystals and the insoluble ingredients, such as $Na_2O$ and alkaline earth oxides such as CaO, SrO, BaO. However, preferably any possible residual glassy phase exists only in the form of inclusions which are dispersed within a microstructure predominantly consisting of keatite mixed crystals.

By such a structure the form stability and temperature stability necessary for the hot forming of glasses can be guaranteed in the region of 550° C. up to about 1000° C. If a larger fraction of high quartz mixed crystal phase or glassy phase would be present in the total body, then the form stability and temperature stability at temperatures above 600° C. or at even higher temperatures could possibly be impaired.

According to a preferred development of the invention the glass ceramic mold after casting of the base glass and/or after annealing is mechanically finished, in particular ground, polished or lapped.

In this way the necessary surface characteristics and form precision can be reached by mechanical treatment (preferably with CNC controlled machines) by operations known in the art of glass processing. Even before the transformation into an opaque ceramic occurs, a quality inspection can be performed in a particularly simple way while still being in the transparent state.

According to another advantageous development of the invention the sagging of the blank onto the glass ceramic mold is assisted by applying a vacuum or an excess pressure.

In this way a particularly good form precision of <10 µm can be obtained.

In a suitable development of the invention the blank is mechanically processed on both sides, preferably polished, before sagging onto the glass ceramic mold.

Thereby a particularly high quality and precision of the formed body thus prepared can be reached.

According to another advantageous development of the invention a blank of a borosilicate glass, particularly BOROFLOAT® (borosilicate glass, Schott Glas) glass, DURAN® (borosilicate glass, Schott Glas) glass or PYREX® (borosilicate glass, Corning) glass is sagged onto the glass ceramic mold at a temperature between about 550° C. and 850° C.

In this way the advantageous characteristics of borosilicate glass can be utilized for the manufacture of X-ray mirror substrates, since borosilicate glass exhibits a very low tendency to crystallization and can be processed very advantageously in the given temperature range. Herein the temperature is preferably considerably above the transition temperature of the particular glass, whereby a high form precision and surface quality is reached during replication even at a short holding time.

According to an advantageous development of the invention the formed body is cooled after forming with a small cooling rate of preferably at the most 1 K/min, in particular 0.5 K/min, more particular 0.25 K/min, mostly preferred at about 0.1 K/min.

In this way a particularly stress-free formed body having a high form precision is obtained.

For the manufacture of particularly high-quality formed bodies the forming of the blank is preferably performed under clean-room conditions.

In another advantageous development of the invention the contact surface of the blank with the glass ceramic mold is utilized as the back surface of a mirror to be prepared there from.

In this way any possible surface defects, which may emerge during manufacture of the mirror substrate, are arranged on the back surface of the mirror, thus being at a less critical region.

According to another advantageous development of the invention the glass ceramic mold is designed concavely when the thermal coefficient of expansion of the mold is smaller than that of the blank.

This is usually the case with commonly utilized borosilicate glasses.

Herein a concave mold having a cone profile, a hyperbolic profile, a parabolic profile (Wolters profile) is utilized, in case an application as an X-ray mirror substrate is desired.

However, if the coefficient of thermal expansion of the glass ceramic mold is larger than that of the blank, then the mold is preferably designed convexly.

After forming the formed body may be mechanically finished, preferably polished, to obtain a surface quality as good as possible.

In case a utilization as a mirror substrate is intended, then a reflective coating may be applied to the formed body.

As a base glass for the manufacture of a keatite glass ceramic mold preferably a glass is utilized comprising the following components (in weight percent):

| | |
|---|---|
| $SiO_2$: | 35–75 |
| $Al_2O_3$: | 17–32 |
| $Li_2O$: | 2–8 |
| $B_2O_3$: | 0–5 |
| $P_2O_5$: | 0–17 |
| $SnO_2 + ZrO_2 + TiO_2$: | 0.1–7 |
| $Na_2O + K_2O + Cs_2O$: | 0–6 |
| $CaO + MgO + SrO + BaO + ZnO$: | 0–8 |
| refining agents such as $Sb_2O_3$, $As_2O_3$, $SnO_2$, $CeO_2$, sulfate or chloride compounds: | 0–3 |
| coloring oxides such as $V_2O_5$, $Cr_2O_3$, MnO, $Fe_2O_3$, CoO, NiO and other oxides: | 0–10. |

Herein particularly preferred a base glass is utilized comprising the following components (in weight percent):

| | |
|---|---|
| $SiO_2$: | 55–70 |
| $Al_2O_3$: | 19–25 |
| $Li_2O$: | 2.5–4.5 |
| $B_2O_3$: | 0–1 |
| $P_2O_5$: | 0–8 |
| $SnO_2 + ZrO_2 + TiO_2$: | 0.5–5 |
| $Na_2O + K_2O + Cs_2O$: | 0.1–3 |
| $CaO + MgO + SrO + BaO + ZnO$: | 0–5 |
| refining agents such as $Sb_2O_3$, $As_2O_3$, $SnO_2$, $CeO_2$, sulfate or chloride compounds: | 0–2 |
| coloring oxides such as $V_2O_5$, $Cr_2O_3$, MnO, $Fe_2O_3$, CoO, NiO and other oxides: | 0–2. |

With such a lithium alumino silicate base glass the desired predominant forming of a keatite phase in the keatite glass ceramic body can be obtained. Silicon oxide, aluminum oxide and lithium oxide are all necessary in the given range to effect some crystallization and a low thermal expansion. These components are components of the keatite mixed crystals. The $Al_2O_3$ contents should preferably not be higher than 19.8 weight percent, since otherwise high $SiO_2$ contents of residual high quartz mixed crystals could be promoted. By contrast, too high a $Al_2O_3$ content could lead to undesired deglassing of mullite. Preferably, boron oxide is not added at all or only in small amounts, since higher boron oxide contents are detrimental for the crystallization. $P_2O_5$ may be added as a further component. Mandatory is the addition of $ZrO_2$ or $TiO_2$ as nucleation initiators. Alternatively or in addition also $SnO_2$ may be added. The addition of the alkalis $Na_2O$, $K_2O$, $Cs_2O$ as well the alkaline earths CaO, SrO, BaO improves the meltability and the deglassing characteristics of the glass during manufacture. MgO and ZnO act in a similar way. The glass ceramic may be prepared while adding common refining agents, such as e.g. $As_2O_3$, $Sb_2O_3$, $SnO_2$, $CeO_2$, $NO_2$, $CeO_2$, sulfate or chloride compounds, such as NaCl. Also coloring oxides, such as $V_2O_5$, $Cr_2O_3$, MnO, $Fe_2O_3$, CoO, NiO or other oxides may be present in the given ranges.

Preferably, a composition may be utilized which corresponds to the known composition of ZERODUR® (glass ceramic) or ZERODUR-M (glass ceramic) sold by the applicant. In addition, also other similar glass ceramics may be utilized as a base glass, such as CERAN® (glass ceramic, Schott Glas), ROBAX® (glass ceramic, Schott Glas), CLEARCERAM® (glass ceramic, Ohara, Inc.), NEOCERAM (glass ceramic, NeoCeram SA), ASTROSITALL (glass ceramic, Lytkarino Optical Glass Factory).

As mentioned above, the glass ceramic mold of keatite ceramic according to the invention is particularly suitable for the manufacture of formed bodies from glass for the preparation of X-ray mirrors, in particular for telescope applications, by applying a sagging process.

X-ray mirror substrates made of glass offer particular advantages over other substrate materials, due to their high self stiffness, low expansion, low density and thereby higher thickness at equal mass, good polish ability, as well as a good availability also at large dimensions and a simple processing by known processing operations. In addition, also an inspection for inner stresses can be effected on transparent formed bodies after the replication process. Inner stresses within the mirror substrate could lead to a deformation, to a bending or warping, so that the necessary precise shape of the mirror segments could not be reached anymore. A transparency of the processed formed body also allows for an inspection of inner glass qualities.

It will be understood that the above-mentioned and following features of the invention are not limited to the given combinations, but are applicable in other combinations or taken alone without departing from the scope of the present invention.

Further features and advantages of the invention will become apparent from the following description of preferred embodiments taken in conjunction with the drawings. In the drawings.

DETAILED DESCRIPTION OF THE PREFERRED EMBODIMENTS

Figure 1:
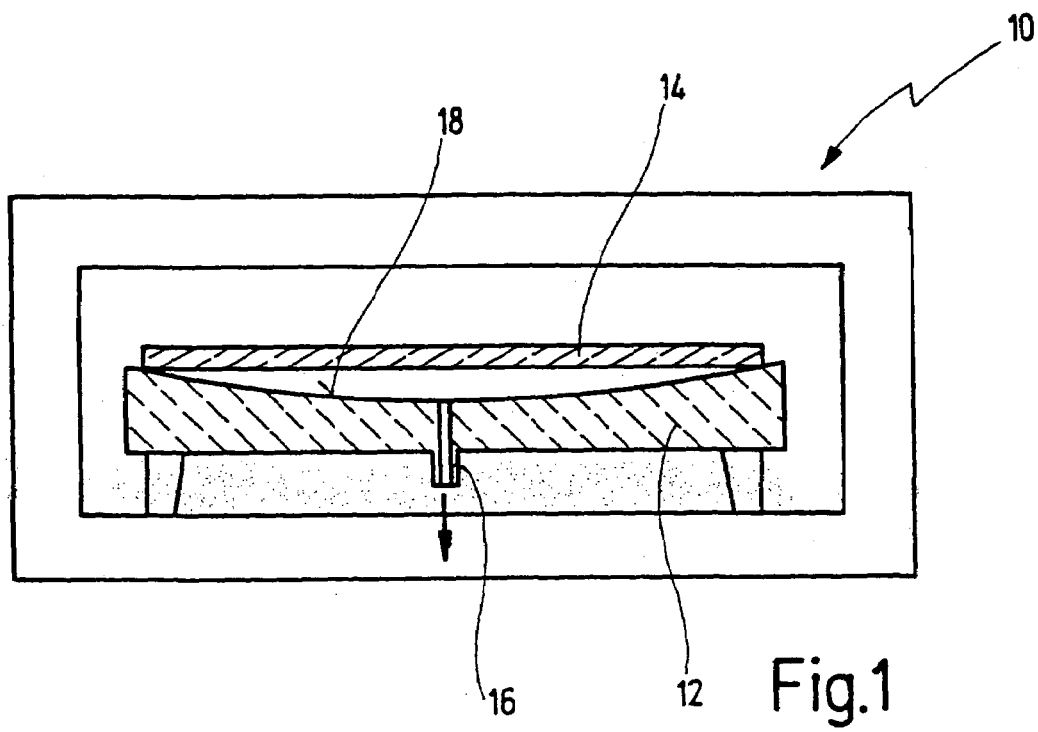
FIG. 1 is a schematic representation of a device for vacuum sagging utilizing a glass ceramic mold according to the invention, shown in the initial state.

According to the invention a mold for the hot forming of glass or glass ceramics is prepared as a glass ceramic mold from a base glass by casting, this being transformed into a keatite glass ceramic of predominant keatite phase by means of annealing. To this end a base glass can be utilized preferably comprising the following components (in weight percent):

| | |
|---|---|
| $SiO_2$: | 55–70 |
| $Al_2O_3$: | 19–25 |
| $Li_2O$: | 2.5–4.5 |
| $B_2O_3$: | 0–1 |
| $P_2O_5$: | 0–8 |
| $SnO_2 + ZrO_2 + TiO_2$: | 0.5–5 |
| $Na_2O + K_2O + Cs_2O$: | 0.1–3 |
| $CaO + MgO + SrO + BaO + ZnO$: | 0–5 |
| refining agents such as $Sb_2O_3$, $As_2O_3$, $SnO_2$, $CeO_2$, sulfate or chloride compounds: | 0–2 |
| coloring oxides such as $V_2O_5$, $Cr_2O_3$, MnO, $Fe_2O_3$, CoO, NiO and other oxides: | 0–2. |

Initially, the lithium-aluminosilicate base glass is molten, possibly while adding common refining agents, and is cast into a mold.

Thereafter for example firstly after cooling to room temperature the surface characteristics and the inner characteristics may be inspected for possible inclusions, such as pores, bubbles, striae etc., and possibly a mechanical treatment by grinding, polishing or lapping may be performed.

Subsequently firstly annealing for nucleation is performed at nucleation temperature in the region of about 600 to 900° C., preferably in the region of about 600 to 800° C. Herein starting from the nucleating agents $TiO_2$, $ZrO_2$ or $SnO_2$ nuclei are formed in large numbers. By contrast, also before this a cooling to room temperature can be performed, this also leading to additional nuclei. Only during a subsequent annealing at a higher temperature a crystallization occurs, i.e. a growing of the nuclei, to form the crystalline phase. Also this can initially be performed in a region suitable for the forming of a high quartz crystal phase, namely in a temperature region of about 700 to 900° C. If subsequent cooling to room temperature is performed, this yields a glass ceramic having as crystal phase predominantly high quartz mixed crystals. If this glass ceramic is subsequently heated to a higher temperature, necessary for keatite formation, namely to a temperature range between about 800 and 1300° C., preferably to a temperature of at least 1000° C., then the high quartz mixed crystals formed before largely transform to keatite mixed crystals while growing simultaneously. The annealing at keatite formation temperature herein preferably is performed at a sufficiently high temperature and for a sufficiently long time to ensure a largely complete transformation of the crystal phase into a keatite mixed crystal phase. E.g., this may be ensured by annealing at about 1000° C. for a time of at least one hour, e.g. for four hours.

Subsequently cooling to room temperature is effected.

Alternatively also the keatite glass ceramic may be prepared without any immediate cooling, after annealing at nucleation temperature, by immediately heating to the higher temperature necessary for keatite formation at which a sufficient holding time is spent. However, since an opaque body is formed hereby, a subsequent (optical) inspection for the inner quality of the keatite glass ceramic mold formed thereby is complicated.

The resulting coefficient of expansion of the keatite glass ceramic is in the range of about $1\times10^{-6}$/K to $3\times10^{-6}$/K, however, preferably of about $2.0\times10^{-6}$/K, between 20° C. and 700° C.

For the preparation of mirror substrates, in particular for X-ray mirrors for telescope applications the keatite glass ceramic mold resembles the inverse form of the necessary mirror substrate, wherein differences in the coefficients of expansion between mold and glass substrate must be taken into account and in and correspondingly included in the shape of the mold. Preferably, herein the difference between the two coefficients of expansion is kept as small as possible, and the coefficient of expansion of the keatite glass ceramic mold is matched during manufacture correspondingly. If the coefficient of expansion of the mold is larger than that of the glass, preferably, a convex form is utilized. However, if the coefficient of expansion of the mold is smaller than that of the glass, such as when utilizing a borosilicate glass, then a concave shape may be utilized. For the forming of high precision mirror substrates preferably the later mirror backside is in contact with the mold to avoid surface defects due to contacts on the mirror side.

Preferred materials for the mirror substrates are borosilicate glasses (BOROFLOAT® (borosilicate glass), DURAN® (borosilicate glass), PYREX® (borosilicate glass)) having a low coefficient of expansion of 3 to $4\times10^{-6}$/K. Preferably, the glass substrate is initially polished on both sides to reach a small variation in thickness of the glass and a flat surface. Usually the glass substrate is applied onto the mold as a flat plate, and subsequently both are heated together according to a heating program up to a temperature above the transition temperature of the substrate glass ($T>T_g$). For some particular borosilicate glasses (BOROFLOAT®, (borosilicate glass)) the necessary sagging temperature herein is between 560° C. and 760° C. Preferably, the cooling to room temperature is performed at small cooling rates of about 0.5 K/min to avoid the formation of inner stresses within the glass substrate. A correspondingly good temperature homogeneity within the furnace must be ensured. Also to obtain the surface quality necessary for X-ray mirror substrates, the contact surfaces of the mold and the substrate should be kept particularly clean. Therefore, the sagging process is preferably performed under clean room conditions to avoid any dust particles. By sagging under gravity force a precision of >30 μm can be reached. By the assistance of a vacuum or possibly by an excess pressure a form precision of >10 μm or even lower is possible. During sagging it should be taken into account that the sagging temperature must be matched to the sagging geometry. At other thicknesses and other dimensions the sagging temperature must be adjusted accordingly.

EXAMPLE

A base glass comprising the following components (in weight percent) was molten:

| | |
|---|---|
| SiO$_2$ | 55.50 |
| Al$_2$O$_3$ | 25.30 |
| P$_2$O$_5$ | 7.90 |
| Li$_2$O | 3.70 |
| Na$_2$O | 0.50 |

-continued

| | |
|---|---|
| MgO | 1.00 |
| ZnO | 1.40 |
| TiO$_2$ | 2.30 |
| ZrO$_2$ | 1.90 |
| As$_2$O$_3$ | 0.50. |

This corresponds to a possible composition of the glass ceramic sold by the applicant under the trademark ZERODUR® (glass ceramic). The base glass manufactured in this way after refining was cast into a blank glass block and thereafter ceramized by controlled crystallization, while utilizing a temperature program. To this end initially heating up to 730° C. was performed at 0.1 K/min, 730° C. were maintained for a time period of 24 hours, subsequently heating up to 850° C. was performed at 0.1 K/min, this followed by a further holding at 850° C. for 48 hours, this followed by a slow cooling to room temperature at 0.1 K/min.

Depending on the size of the glass ceramic block this temperature profile must be adjusted accordingly to yield a high precision crack-free glass ceramic having a high quartz mixed crystal phase in the desired range.

The crystallization is an exothermal process during which the material shrinks. For the manufacture of large glass ceramic blocks a homogenous temperature distribution with a local temperature deviation of 2 K at the most must be obtained across the complete glass ceramic block. Thus the ceramization process of large blocks of several meters diameter may take up to nine months.

From a thus manufactured glass ceramic block of predominant high quartz crystal phase a suitable blank part was cut out, mechanically processed at its surface and inspected for its quality.

Thereafter heating up to 1000° C. was performed at 1 K/min, followed by a holding at this temperature for a time of four hours, before a controlled cooling to room temperature was performed at 1 K/min.

The keatite glass ceramic manufactured thereby was completely opaque and resembled only a small glassy residual fraction, while the crystalline phase had almost completely transformed into keatite mixed crystal phase. The mold manufactured thereby was mechanically processed and finally lapped to yield the necessary shape and surface characteristics.

Figure 2:
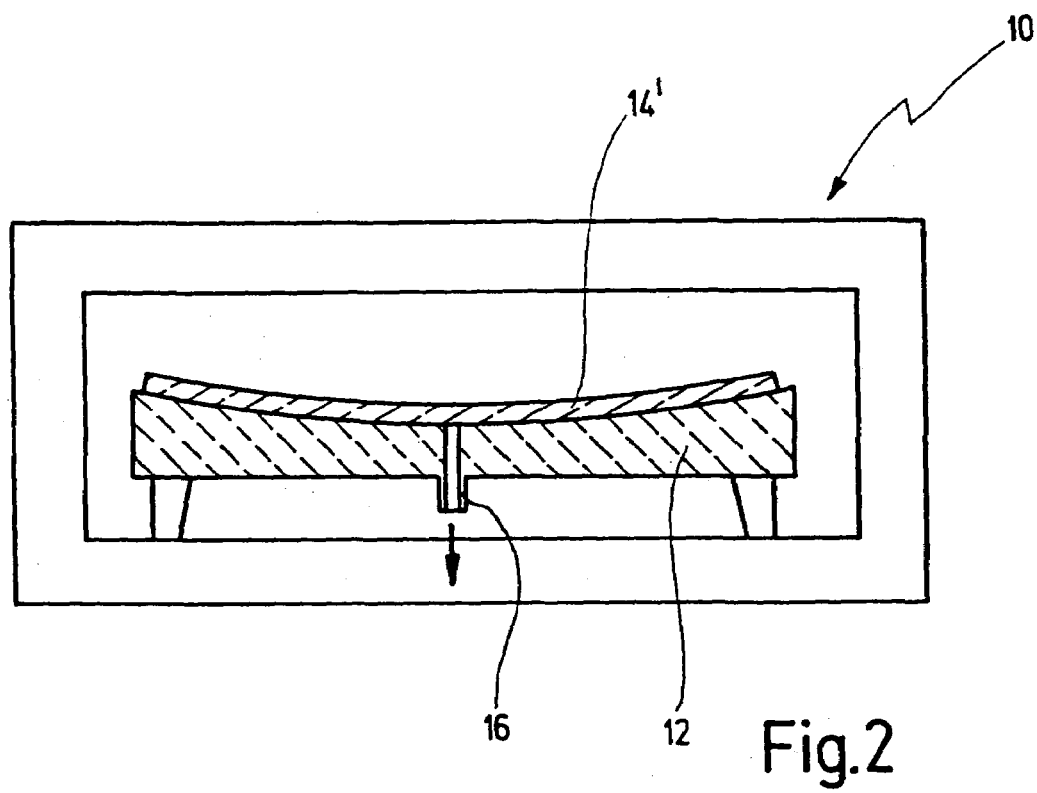
FIG. 2 shows the device according to FIG. 1 in its final state in which the blank has set against the surface of the mold.

Within a furnace which is shown in FIGS. 1 and 2 and designated in total with numeral 10, a borosilicate glass blank was replicated from this mold.

The furnace 10 is a furnace known in the art allowing for a homogenous temperature distribution and a selective heating and cooling at very slow heating rates and cooling rates, respectively.

In such a furnace 10 a borosilicate blank 14 of BOROFLOAT® (borosilicate glass) was sagged at about 650° C. onto the keatite glass ceramic form 12 prepared before, without the application of a vacuum.

With such a sagging process the form tolerance of the shaped body 14'formed thereby can reach >30 μm when utilizing BOROFLOAT® (borosilicate glass) glass plates polished on both sides.

To effect an even better form tolerance of <10 μm, a vacuum sagging is preferred, as indicated in FIGS. 1 and 2. Herein the keatite glass ceramic form 12 is preferably prepared already with one or more vacuum connections 16 to which later, as shown in FIG. 2, during hot forming of the glass substrate 14' a vacuum is applied. Herein the blank 14 sets against the surface 18 of the keatite glass ceramic form 12 with a good form precision of <10 μm.

The invention claimed is:

1. A method for the hot forming of X-ray mirror substrates from a borosilicate glass comprising the following steps:
    preparing a mold from a lithium-aluminosilicate base glass by casting and subsequent heat treatment for transforming into a keatite glass ceramic comprising at least 80 vol.-% of keatite mixed crystals;
    mechanically finishing the mold to a desired shape and surface quality;
    preparing a blank plate of a borosilicate glass for hot forming;
    polishing said blank plate on both surfaces;
    sagging said blank plate under gravity force onto said mold at a temperature above the glass transition temperature of the blank plate; and
    cooling the blank plate, after sagging, to room temperature at a controlled cooling rate of about 0.1 K/min, thereby producing a formed body.

2. The method of claim 1, wherein sagging of the blank onto the glass ceramic mold is assisted by applying a vacuum.

3. The method of claim 1, wherein sagging of the blank onto the glass ceramic mold is assisted by applying an excess pressure.

4. The method of claim 1, wherein producing of the formed body is performed under clean room conditions.

5. The method of claim 1, wherein the glass ceramic mold is designed concavely when the coefficient of thermal expansion of the mold is smaller than that of the blank.

6. The method of claim 1, wherein the glass ceramic mold is prepared with a Wolter's profile.

7. The method according of claim 1, wherein the formed body after having been formed is mechanically finished.

8. The method according of claim 1, wherein a reflective coating is applied to the formed body.

9. The method of claim 1, wherein said blank plate of borosilicate glass is one of the group consisting of BOROFLOAT® (borosilicate glass) glass plate, a DURAN® (borosilicate glass) glass plate and a PYREX® (borosilicate glass) glass plate, and wherein said sagging step is performed at a temperature between 550° C. and 850° C.

10. A method for the hot forming of glass or glass ceramics comprising the following steps:
    preparing a mold from a lithium-aluminosilicate base glass by casting and subsequent heat treatment for transforming into a keatite glass ceramic mainly comprising keatite mixed crystals;
    providing a blank plate of glass or glass ceramics for hot forming;
    polishing said blank plate on both surfaces;
    sagging said blank plate under gravity force onto said mold at a temperature above the transition temperature of the blank plate;
    cooling the blank plate, after sagging, to room temperature at a controlled cooling rate of about 0.1 K/min.

* * * * *